United States Patent
Zhuang et al.

(10) Patent No.: US 10,846,007 B2
(45) Date of Patent: Nov. 24, 2020

(54) SHUFFLE MANAGER IN A DISTRIBUTED MEMORY OBJECT ARCHITECTURE

(71) Applicant: MemVerge, Inc, San Jose, CA (US)

(72) Inventors: Peiyu Zhuang, Shanghai (CN); Kunwu Huang, Shanghai (CN); Yue Zhao, Shanghai (CN); Wei Kang, Beijing (CN); Haiyan Wang, Fremont, CA (US); Yue Li, Fremont, CA (US); Jie Yu, Shanghai (CN)

(73) Assignee: MEMVERGE, INC., San Jose, CA (US)

( * ) Notice: Subject to any disclaimer, the term of this patent is extended or adjusted under 35 U.S.C. 154(b) by 52 days.

(21) Appl. No.: 16/372,161

(22) Filed: Apr. 1, 2019

(65) Prior Publication Data

US 2020/0042221 A1 Feb. 6, 2020

Related U.S. Application Data

(63) Continuation-in-part of application No. 16/255,414, filed on Jan. 23, 2019.

(60) Provisional application No. 62/713,537, filed on Aug. 2, 2018.

(51) Int. Cl.
*G06F 3/06* (2006.01)
*G06F 9/50* (2006.01)
*G06F 16/901* (2019.01)
*G06F 12/084* (2016.01)

(52) U.S. Cl.
CPC ............ *G06F 3/0644* (2013.01); *G06F 3/067* (2013.01); *G06F 3/0611* (2013.01); *G06F 3/0643* (2013.01); *G06F 9/5016* (2013.01); *G06F 9/5077* (2013.01); *G06F 12/084* (2013.01); *G06F 16/9017* (2019.01)

(58) Field of Classification Search
None
See application file for complete search history.

(56) References Cited

U.S. PATENT DOCUMENTS

2016/0103845 A1* 4/2016 Yeddanapudi ........ G06F 16/116
707/756

* cited by examiner

*Primary Examiner* — Charles J Choi

(57) ABSTRACT

Disclosed herein is an apparatus and method for a shuffle manager for a distributed memory object system. In one embodiment, a method includes forming a system cluster comprising a plurality of nodes, wherein each node includes a memory, a processor and a network interface to send and receive messages and data, wherein the network interface operates on remote direct memory access; creating a plurality of sharable memory spaces having partitioned data, wherein each space is a distributed memory object having a compute node, wherein the sharable memory spaces are at least one of persistent memory or DRAM cache; and storing data in an in-memory data structure when there is available memory in a compute node; and if there is an out of memory condition, serializing at least some of the in-memory data and spilling it to a distributed memory object system to persist shuffled data outside the compute node.

12 Claims, 15 Drawing Sheets

SHUFFLE MANAGER IN A DISTRIBUTED MEMORY OBJECT ARCHITECTURE

CROSS-REFERENCE TO RELATED APPLICATION(S)

This application claims the benefit of and priority to U.S. Provisional Patent Application Ser. No. 62/713,537, filed on Aug. 2, 2018 for "Distributed Memory Object Architecture that Enables Memory-Speed Data Access for both Memory Semantics and Storage Semantics in a Distributed Environment", and 2) U.S. Non-provisional patent application Ser. No. 16/255,414, filed on Jan. 23, 2019 for "A Distributed Memory Object Architecture", the entire disclosure of which are incorporated herein by references.

TECHNICAL FIELD

The present disclosure relates generally to distributed computing environments, and more particularly, to a shuffle manager in a distributed memory object architecture.

BACKGROUND

The computer industry continues to develop and refine solid-state storage devices and media, moving closer and closer to achieving memory-class storage. In the past decade there has been a thousand-fold reduction in access latency of affordable storage devices, and another twenty-fold reduction is expected within the year. At the same time, networking speeds have seen more than a 100-time increase in bandwidth with commensurate latency decrease, plus the emergence of standardized remote direct memory access (RDMA) functionality that can improve communication efficiency and further reduce latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random access memory (DRAM) capacity, and where highly frequent data movements between DRAM and lower storage tiers, such as solid state drive (SSD) and hard disk drive (HDD), are therefore required.

To provide the lowest possible access latency, operating system support of emerging persistent memory (Pmem) technology has created mechanisms for a user-space application to have direct access (DAX) to persistent memory media (i.e., without the access being performed by operating system software). Examples of existing solutions include:

"NOVA", which is a single-node file system for persistent memory with emphasis on consistency. It uses per-file metadata journals for fast, concurrent, consistent updates. NOVA also supports DAX memory mapped access. It, however, does not provide cross-node replication or availability.

"Strata", which is a single-node file system that provides a tiered, log-structured file system starting from a persistent memory layer and progressing to SSD then HDD as the data access frequency cools. It, however, does not support DAX memory map access, nor provide cross-node replication or availability.

"Octopus", which is a multi-node distributed persistent memory file system using tightly integrated RDMA to reduce communication latency. It, however, does not support DAX memory mapped access.

"Hotpot", which is a multi-node kernel-level distributed shared persistent memory system that provides low latency, transparent memory accesses, data persistence, data reliability, and high availability. It is focused on memory mapped access and does not address standard file storage IO operations.

"FluidMem", which is a multi-node system that realizes disaggregated memory in the datacenter. It does not address memory persistence or storage IO.

None of these existing solutions, however, provide low-latency access of multi-node distributed data objects with both the semantics of memory and the semantics of file storage. It is therefore desirable to provide low-latency memory spaces: 1) that are accessible across a cluster of nodes, 2) that can exceed the memory capacity of a given node in the cluster, and 3) that can span the memory and storage of multiple nodes. It is further desirable that these memory spaces be accessible with either the load/store semantics of memory, or with the read/write, input/output semantics of file storage. Disclosed herein in a distributed memory object (DMO) system, referred to as MemVerge DMO system, that provides these types of low-latency memory spaces.

SUMMARY

Disclosed herein is an apparatus and method for a shuffle manager in a distributed memory object. In one embodiment, a method includes forming a system cluster comprising a plurality of nodes, wherein each node includes a memory, a processor and a network interface to send and receive messages and data, wherein the network interface operates on remote direct memory access; creating a plurality of sharable memory spaces having partitioned data, wherein each space is a distributed memory object having a compute node, wherein the sharable memory spaces are at least one of persistent memory or DRAM cache; and storing data in an in-memory data structure when there is available memory in a compute node; and if there is an out of memory condition, serializing at least some of the in-memory data and spilling it to a distributed memory object system to persist shuffled data outside the compute node.

In another embodiment, a shuffle manager for a distributed memory object comprises a system cluster comprising a plurality of nodes, wherein each node includes a memory, a processor and a network interface to send and receive messages and data, wherein the network interface operates on remote direct memory access; a plurality of sharable memory spaces having partitioned data, wherein each space is a distributed memory object having a compute node, wherein the sharable memory spaces are at least one of persistent memory or DRAM cache; and an in-memory data structure to store data when there is available memory in a compute node; and a distributed memory object sorter to serialize at least some of the in-memory data and spill it to a distributed memory object system to persist shuffled data outside the compute node. Other embodiments are explained within this disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

As used in the following description, remote direct memory access (RDMA) refers to a direct memory access mechanism that enables a computer to access the memory of another computer without involving the operating system of either computer. Persistent memory (Pmem) refers to the storage of data structures such that the data can continue to be accessed using memory instructions, e.g., load and store, even after completion of the process that created or modified the data structures.

A MemVerge direct memory object (DMO) system provides persistent distributed memory objects that can be accessed as either in-memory or file-storage mode, and may be implemented in low-latency RDMA. Thus, the MemVerge DMO system enables use of DMOs both as memory and storage. The MemVerge DMO system also allows data in the system to be converted between in-memory and file-storage modes. In general, embodiment MemVerge DMO systems provide close-to-memory-speed data access which in turn can significantly relive data bottlenecks observed at upper layer applications. Furthermore, embodiments may be built in user space, thus obviating the need to install a customized operating system kernel. We now turn to FIG. 1 to discuss an embodiment DMO system in more detail.

Figure 1:
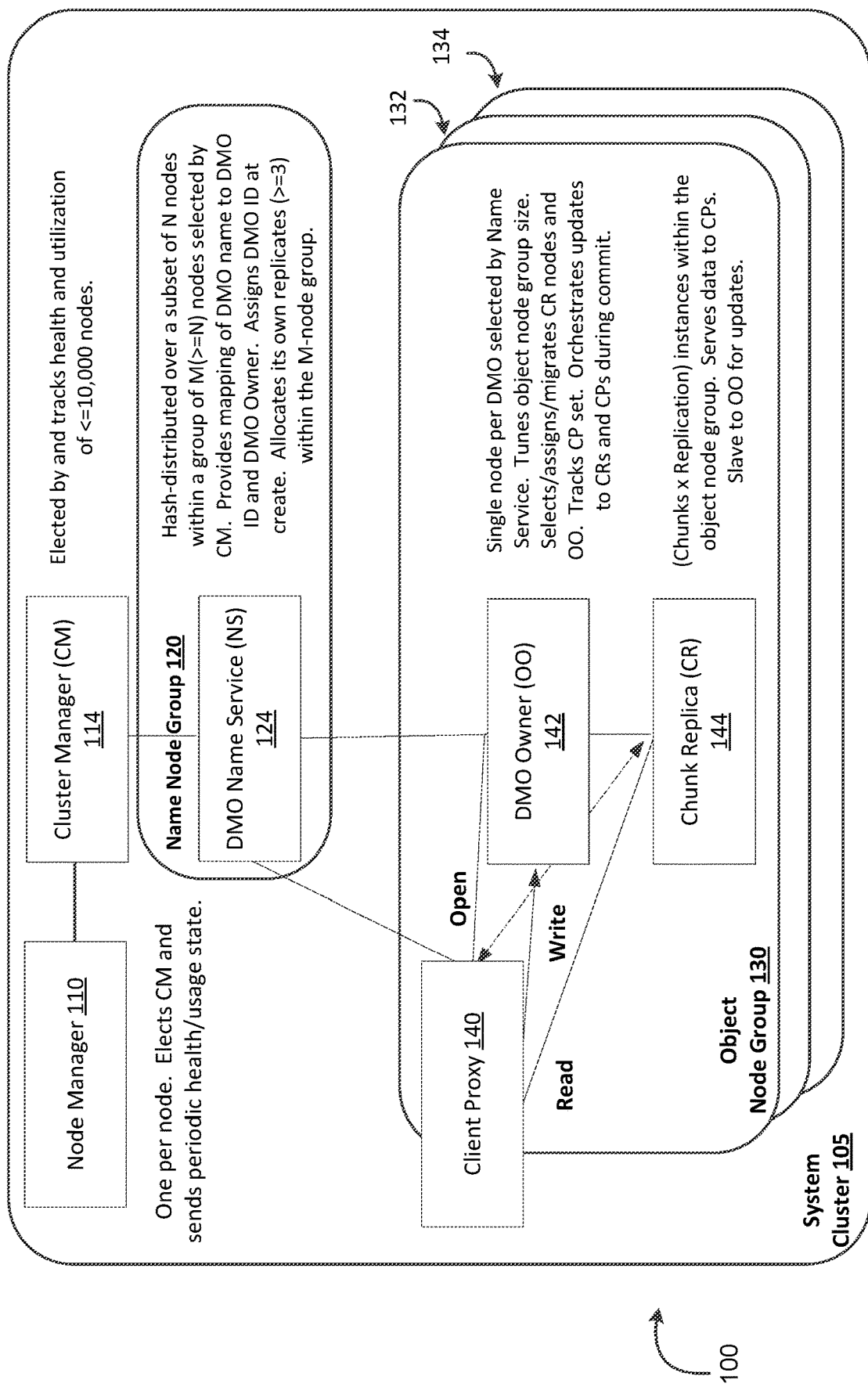
FIG. 1 is an illustration of a system cluster that includes an object node group that implements a distributed memory object (DMO) system, referred to herein a MemVerge DMO system, that provides persistent DMOs that can be accessed as either in-memory mode or file-storage mode.

FIG. 1 is an illustration of one embodiment of a MemVerge DMO system 100 that provides persistent distributed memory objects (DMOs) that can be accessed as either in-memory mode or file-storage mode. In DMO system 100, a system cluster 105 is formed by a number of nodes. Each node includes a memory, a processor and a network interface through which it may send and receive messages and data. The illustrated system 100 provides for the creation of sharable memory spaces, each space being a DMO with a single owner node such as object owner (OO) node 142. In this example a node that uses a DMO is referred to herein as a client proxy (CP) node. In the present embodiment, a system cluster 105 within which a MemVerge DMO system 100 may be implemented includes an object node group 130, a name node group 120, a node manager 110, and a cluster manager 114.

Address space for a DMO may be partitioned into equal size chunks, with each chunk being stored on one or more chunk replica (CR) nodes 144 included in the cluster of nodes 105. The chunks are distributed among a subset of the cluster nodes in such a manner as to: 1) focus locality of the chunks for performance efficiency, 2) provide sufficient availability of address space, and to 3) balance resources among the cluster of nodes. Furthermore, any node in a cluster using a DMO can locally keep a copy of a page.

The object owner node 142 is responsible for coordinating updates to the client proxy nodes 140 as well as the chunk replica nodes 144. The object owner node 142 is also responsible for maintaining a configurable replication factor per DMO. The object owner node 142 and chunk replica nodes 144 can migrate to deal with failures, performance, or resource constraints. Client proxy nodes 140 and chunk replica nodes 144 cooperate with the object owner node 142 in implementing protocols to make coherent updates and thereby provide a crash consistent view in the face of failures.

Various functional components of a DMO system are associated with one or more nodes in the system cluster and are described in the follow paragraphs.

Node Manager (NM)

A node manager (NM) 110 operates on each node in a MemVerge DMO system 100. Once a node manager 110 starts on a node, it can start or stop all other services associated with a node. Some services associated with a node may be started or stopped automatically or by request. The node manager 110 is responsible for finding or electing the cluster manager (CM) 114 and notifying its existence and node health to the cluster manager 114. Hence the node manager 110 has access to performance and exception information from other components in the system 100.

Cluster Manager (CM)

The cluster manager 114 runs on a single node in the MemVerge DMO system 100. The single node on which the cluster manager runs is elected by a consensus algorithm of the node managers. The cluster manager mediates cluster membership, node ID assignment, and the name service (NS) group 120. The cluster manager 114 also chooses nodes to satisfy allocation request constraints against cluster resource loading.

DMO Name Service (NS)

The DMO name service (NS) 124 is a hash-distributed service which provides mapping of a DMO name string to its object ID and the object owner. The service is hash distributed across a set of nodes in the system cluster 105. In the present example, the set of nodes is a name service group that is determined by the cluster manager.

Object Owner (OO)

The DMO object owner 142 is a single-node service that manages a DMO. The node corresponding to the client proxy 140 that creates the DMO becomes the object owner node 142. The object owner is responsible for selecting (via a cluster manager 114) an initial object node group 130 to contain the DMO and for assigning the chunk replicas (CRs) 144 within that node group. Some embodiments may contain additional object node groups 132, 134, etc. The object owner 142 also manages growing, shrinking, migrating, and recovering both the node group 130 as a whole, and the chunk replica 144 assignments within that group, as required to meet the DMO's size and replication requirement, or to optimize its usage efficiency. The object owner 142 can choose to move to another node (e.g., to be on the same node as a write client proxy). If the object owner 142 node fails, the DMO's node group will re-elect an object owner. The object owner keeps track of client proxies and orchestrates all updates affecting the DMO, e.g., configuration changes as well as data writes (msync commits and/or write TO).

Chunk Replica (CR)

The chunk replica 144 is a slave entity to the object owner 142 and client proxy 140. The object owner and client proxy read from and write to the chunk replica 144. The chunk replica owns some amount of storage devices (Pmem, SSD, etc.) on its node and manages the details of how/where a chunk of address space is stored therein.

Client Proxy (CP)

The client proxy 140 performs all input/output operations for the client and locally materializes and synchronizes/persists any object that the client requests to be memory mapped. To do that materialization, the client proxy creates a local cache for pieces of remote chunks that are in use and manages selection and eviction of pieces that are unused (or less actively used) as capacity constraints require. The client proxy 140 has code to specifically handle page fault notifications sent to it by the userfaultfd feature of Linux, or similar page fault notifications in other operating environments.

Example Operation Flows

Figure 2:
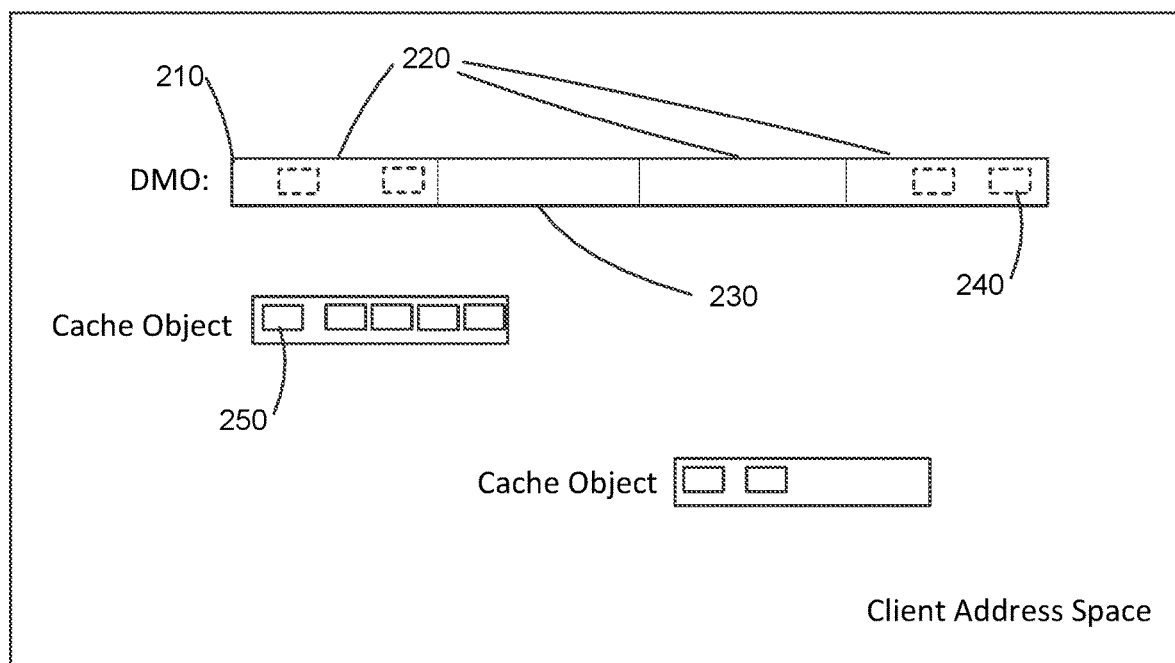
FIG. 2 is an illustration of a DMO in a client address space.

FIG. 2 is an illustration of a DMO in a client address space. When a client proxy opens a DMO, the client proxy allocates a logical address region 210 or space for that DMO and registers the region to monitor for page faults. The client proxy then direct maps for any local chunks 230 at their appropriate offset within the logical address region. Next, the client proxy acquires a remote direct memory access (RDMA) access descriptor to an instance of each remote chunk. The client proxy then creates and maps one or more persistent memory files to use as a cache 250. Now when the application accesses a region of that DMO space that is not direct mapped, a page fault is signaled and the client proxy's page fault handler will allocate an area of the cache file, fill the cache file via an RDMA read of the appropriate remote chunk area 220, and then map that area of the cache file into its appropriate offset of the DMO region, thus completing the handling of the page fault.

Note that management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 2 and additional reference to FIG. 1, a client application installed in a client node or local node, which may be any node in the system cluster of FIG. 1, opens a DMO name. For example, the client application may "call" MemVerge library that is included in the client application and may "call" a client proxy. The MemVerge library is configured to map an anonymous memory region equal to the size of the DMO, to register that memory region for user page faults, to over map 240 the local chunk files on that memory region, and to remember the cache file for later use. The client proxy is configured to call the DMO name service to get the object owner, call the object owner to get table of chunk nodes, to open "local chunk" files that are on the local node, to open an empty "cache file" or "cache object" on the local node, and to reply to MemVerge library in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO, i.e., it can do load/store references to the DMO, and/or read/write input/output calls to/from the DMO. If a load/store reference from the client application accesses a DMO region that is not over mapped, the client application takes/receives a page fault. The MemVerge library gets a page fault notification and calls to the client proxy. The client proxy caches the needed region into the cache file and replies to the MemVerge library. The MemVerge library then can over map the new region onto an appropriate local DMO space.

Thus, from a client application perspective, a MemVerge DMO system 100 enables a user, via the client application in conjunction with a client proxy, to initiate the use of a DMO, have data placed in one or more memory regions mapped to the DMO by either of a store call or a write call, and access data stored in one or more memory regions mapped to the DMO by a load call or a read call.

We now turn to FIG. 5-10 to illustrate a shuffle manager and related components. Embodiments shuffle managers disclosed herein that are implemented by DMO can be used in computing clusters that use shuffle processes.

Figure 5:
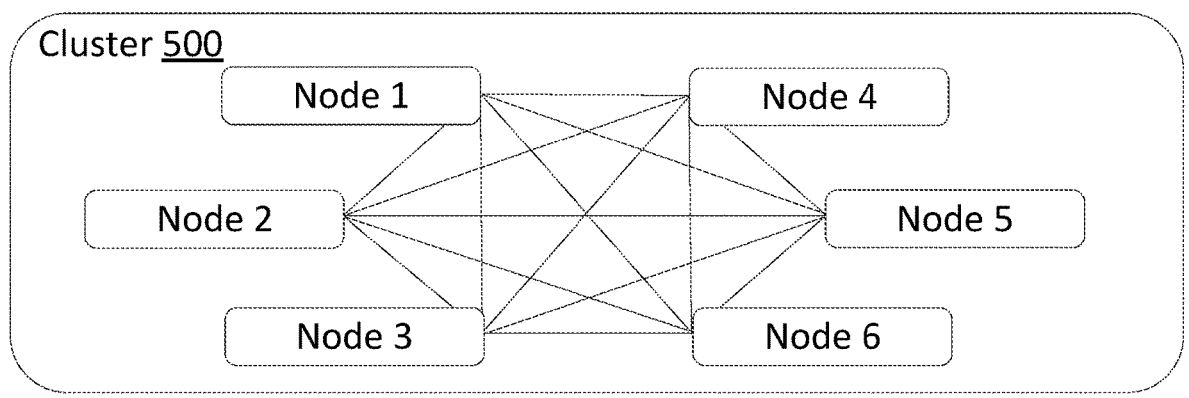
FIG. 5 is an illustration of a distributed computing system with system nodes exchanging data between each other during a computing process.

FIG. 5 is an illustration of a distributed computing system 500, or cluster, with system nodes exchanging data between each other. In this way, system nodes exchange data between each other during computing process in a process called a shuffle. In distributed computing systems, users may need to add or remove compute cluster nodes dynamically. However, conventional shuffle processes in some data processing frameworks (spark, Hadoop, tensor-flow, etc.) keep application status in a local disk which will trigger a re-computation of the shuffle stage when a node is removed. In more detail, a shuffle procedure is divided into two stages: a map and a reduce. During the map stage the shuffle will prepare any data for a reduce stage in local disk. If the node is removed after map, the prepared data in the local disk is lost and the application could not complete a shuffle procedure. This in turn will cause a re-compute from the beginning of the shuffle to be triggered for all the data in the cluster.

During regular operation of a system, a shuffle procedure is essentially happening all the time, therefore removal of a node will essentially always cause re-compute. Additionally, distributed tasks may fail in a compute node for various reasons or the compute node itself may even fail. The possibility of node failure increases rapidly as cluster size increases. As any node failure in the cluster will trigger the re-compute of the shuffle if the state of the shuffle is kept in local disk, a chance for a re-compute increases substantially.

In general, the performance of shuffle is affected by the following factors. Network performance will affect the performance of data exchange between nodes. The usable memory of each node will also affect the performance of the process to generate shuffle output and process shuffle input. Additionally, the shuffle process affects the total data set and could generate considerable intermediate results depending on the operator. In this way overall data may not fit into the memory in a single node and cause performance degradation when data is spilled to disk.

Advancements in distributed storage speed, for example, DRAM, PMEM, etc., allows application to speed up local data spill, read and write. Additionally, use of a dedicated connection allows to speed up the data exchange between nodes. By way of example, some embodiments of a shuffle manager may use PMEM with DRAM cache for storage, and also use RDMA instead of TCP/IP, therefore utilizing a very low response time. This allows embodiments to provide a distributed data cluster allowing a user to persist shuffle data outside the compute node and enable elastic configuration of the computing cluster. That is, a compute node can save data in separated storage system and avoid the situation where shuffle data is lost when a node is removed. A DMO is a distributed system which encapsulates the data communication layer. Each node could access the shuffle data file like a local data file and greatly simplify a shuffle data exchange algorithm. In this way, an external shuffle manager with pluggable high-speed storage and network provides a distributed memory object system that can enlarge memory/storage capacity of single node to a whole cluster.

Figure 6:
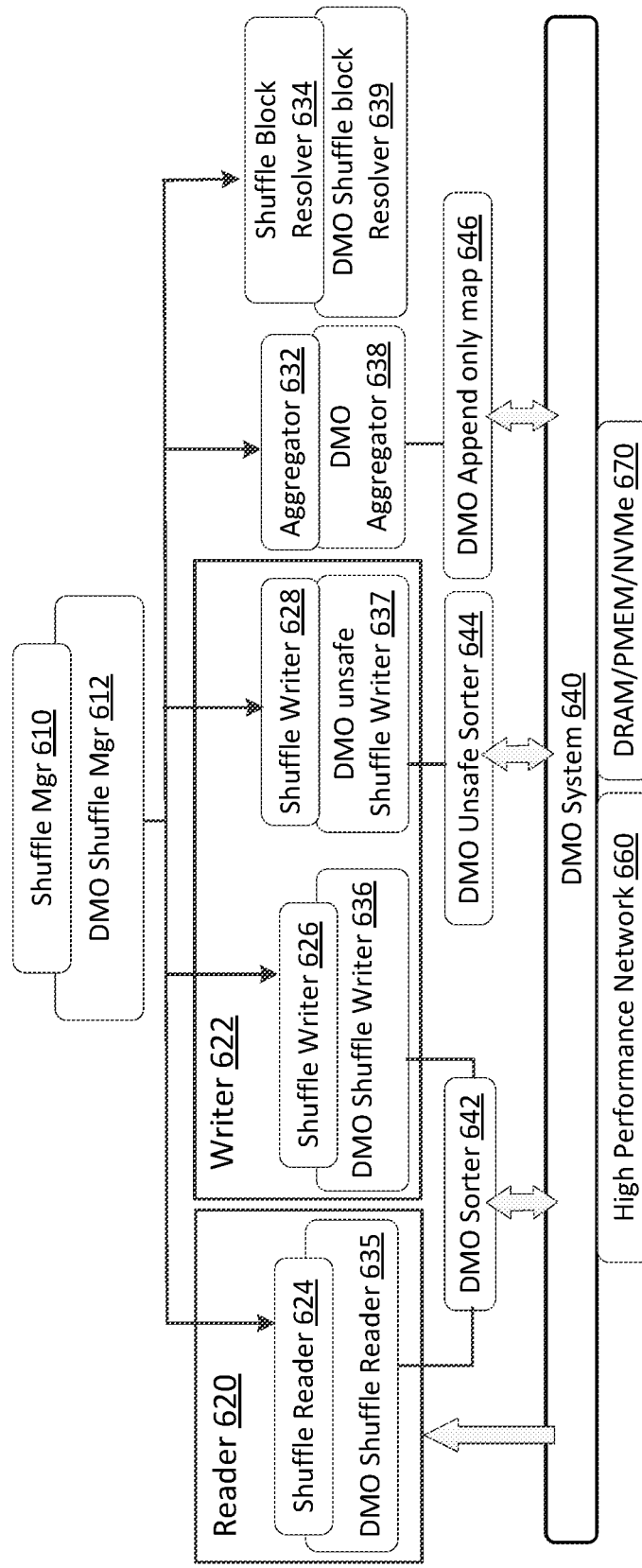
FIG. 6 is an illustration of an embodiment architecture in a shuffle manager based distributed memory object system.

FIG. 6 is an illustration of an embodiment architecture in a shuffle manager based distributed memory object (DMO) system. In this illustration, a thin arrow represents calls/invokes wherein the arrow points from the caller to the callee. A wide arrow represents a data communication where the direction of the arrow indicates the IO flow. Lines in the figure without any array represent a component containing another component. As an example, the ShuffleWriter 628 contains a DMOUnsafeSorter 644 data structure to hold data.

Therefore, with reference to FIG. 6, shuffle manger 610 and DMO shuffle manager 612 can call reader 620, writer 622, aggregator 632 or shuffle block resolver 634. The shuffle manager 610 is the entry point for the shuffle stage. In this embodiment, reader includes a shuffle reader 624 and a DMO shuffle reader 635. Writer 622 includes shuffle writer 626 and DMO shuffle writer 636 as well as shuffle writer 628 and DMO unsafe shuffle writer 637. Aggregator coordinates with DMO aggregator 638 and shuffle block resolver 634 coordinates with DMO shuffle block resolver 639.

In this way in response to the call/invocation, reader 620 may receive data from DMO system 640 operating on a high-performance network 660 and utilizing DRAM/PMEM/NVMe 670. Also, in response to a call/invocation, DMO SORTER 642, DMO unsafe sorter 644 and DMO append only map 646 may send or receive a data communication from the DMO system 640. Therefore, shuffle manager 610, shuffle reader 620, shuffle writer 622, aggregator 632 and shuffle block resolver 634 are interfaces. For example, in one embodiment these interfaces may be API's as defined by a Spark architecture.

With further reference to FIG. 6, then the implementations will include DMO shuffle manager 612, DMO shuffle reader 635, DMO shuffle writer 636, DMO unsafe shuffle writer 637 and DMO shuffle block resolver 639. DMO aggregator 638 implements Aggregator 632 so that a system can use a DMO implementation of the aggregator to avoid certain out of memory situations, for example, when a shuffle process contains an aggregation process such as in an unsafe shuffle algorithm as described below in more detail.

In some embodiments, there may be 2 shuffle writer implementations, depending on the operator and data type used in a shuffle. The DMO unsafe shuffle writer 637 may utilize a java unsafe package to increase speed of a shuffle. That is, logic may be migrated from a conventional system, such as a Spark implementation, wherein an unsafe shuffle writer version is like an optimization when a calculation doesn't contain any aggregation operation and the serialization algorithm used supports data relocation without deserialize.

Continuing with FIG. 6, the DMO sorter 642, DMO unsafe sorter 644 and DMO append only map 646 are key data structures used by the reader 620, writer 622 and the aggregator 632, as described in more detail below.

Shuffle writer 626 is responsible for writing shuffle data during a map task. It utilizes DMO sorter 642 or DMO unsafe sorter 637 to hold data in memory. If there is not enough memory to hold the data, the DMO unsafe sorter 637 spills the data to DMO as explained with reference to FIG. 8.

Figure 7:
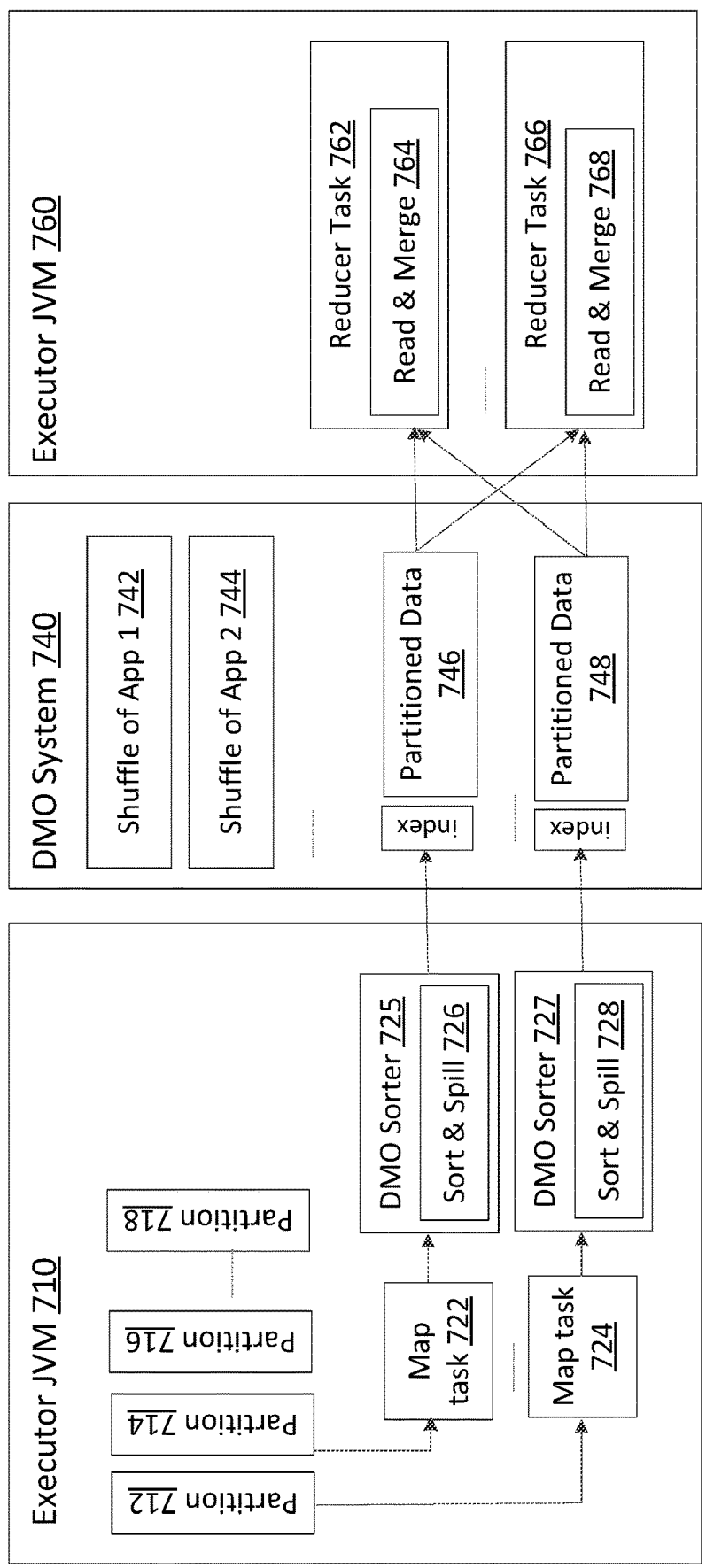
FIG. 7 is an illustration of one embodiment of a shuffle algorithm.

Shuffle reader 624 is used in a reducer as shown in FIG. 7, to collect the data from DMO 640 and can also utilize DMO sorter 642.

DMO aggregator 638 is responsible for doing data aggregation if specified by the application. DMO aggregator 638 uses DMO append only map 646 to hold the data in memory and spill the data to DMO 640 if there is not enough memory.

The shuffle block resolver 634 is used to locate the data in DMO with an identification. That is, a shuffle process generates output named shuffle output files that are the output of a mapper task 722 and 724 and the input of reducer tasks 762 and 766. In more detail, each of these files will have its name and location held in the storage. The resolver's responsibility is to locate the file in storage when a name is given. As an example, when mapper task 3 for shuffle 0 completes, it asks the resolver where should it put data for shuffle 0, mapper 3. For reduce task 5, it will ask resolver where to retrieve the data for shuffle 0, mapper 3 and reducer 5. The resolver will tell reducer the location of the data file for shuffle 0 mapper 3 and reducer will locate its own data in that file.

FIG. 7 is an illustration of one embodiment of a shuffle algorithm. The embodiment in FIG. 7 includes an executor Java Virtual Machine (JVM) 710, having partitions 712, 714, 716 and 718, and potentially more, map task 722 and map task 724, and DMO sorter 725 having a sort and spill module 726 and DMO sorter 727 having a sort and spill module 728. The embodiment further includes DMO system 740 having shuffle of app 1 742, shuffle of app 2 744, and an index and partitioned data 746 and another index and partitioned data 748, and executor JVM 760 including reducer task 762, read and merge 764, reducer task 766 and read and merge 768.

In the illustrated embodiment, source data is composed of partitions, which can be the output of the last executed calculation stage. In this way, each map task 722 and 724 will calculate one partition and generate a map output.

During map stage, a task puts the processing data into DMO sorter 725. DMO sorter 725 will do a map side calculation and hold the data in memory or spill the data to DMO 740.

When a map side calculation is done, in-memory data together with spilled data will be merged together to form the map output. As an example, consider we have data ('a', 1), (a', 3), (b', 5), ('a', 7) and we want to sum the value by key. DMO sorter 725 will put the data into memory record-by-record while doing the sum calculation. And we will have ('a', 4), ('b', 5) in memory when the first 3 records are processed. If memory is not enough for a next record, (a', 4), (b', 5) will be serialized as a spill file and saved to storage, such as in DMO 740, and memory is cleared. When all the records are processed, there will be a ('a', 7) in memory and (a', 4), ('b', 5) in a spilled file. At this time, DMO sorter 725 will read the data in the spill file back and merge with the data in memory. Finally, we will have (a', 11), ('b', 5) and they will be serialized again and saved as shuffle output for the mapper. In this embodiment, the map output is then saved under the folder of the current application in DMO 740 to avoid a name conflict.

Then, each reducer retrieves its partition of the data from each map output from the DMO system 740. By way of example, partitioned data 746 and 748 are the output of mappers, wherein the data files are divided into partitions 712-718. Additionally, the boundary of each partition is recorded in the index file associated with the partitioned data 746 and 748. In some embodiments, each reducer 762 and 766 can have its own partition in all map output files. In this way, the system will loop all map files and locate the index file from a resolver first. And in the index file, it can find the boundary of the partitions, as referenced above. Then the embodiment can ask the resolver (again) where the data file is and retrieves the data for its own with the boundary information retrieved from index file. The reducers 762 and 766 will then conduct the reduce side calculation and form the final output.

Figure 8:
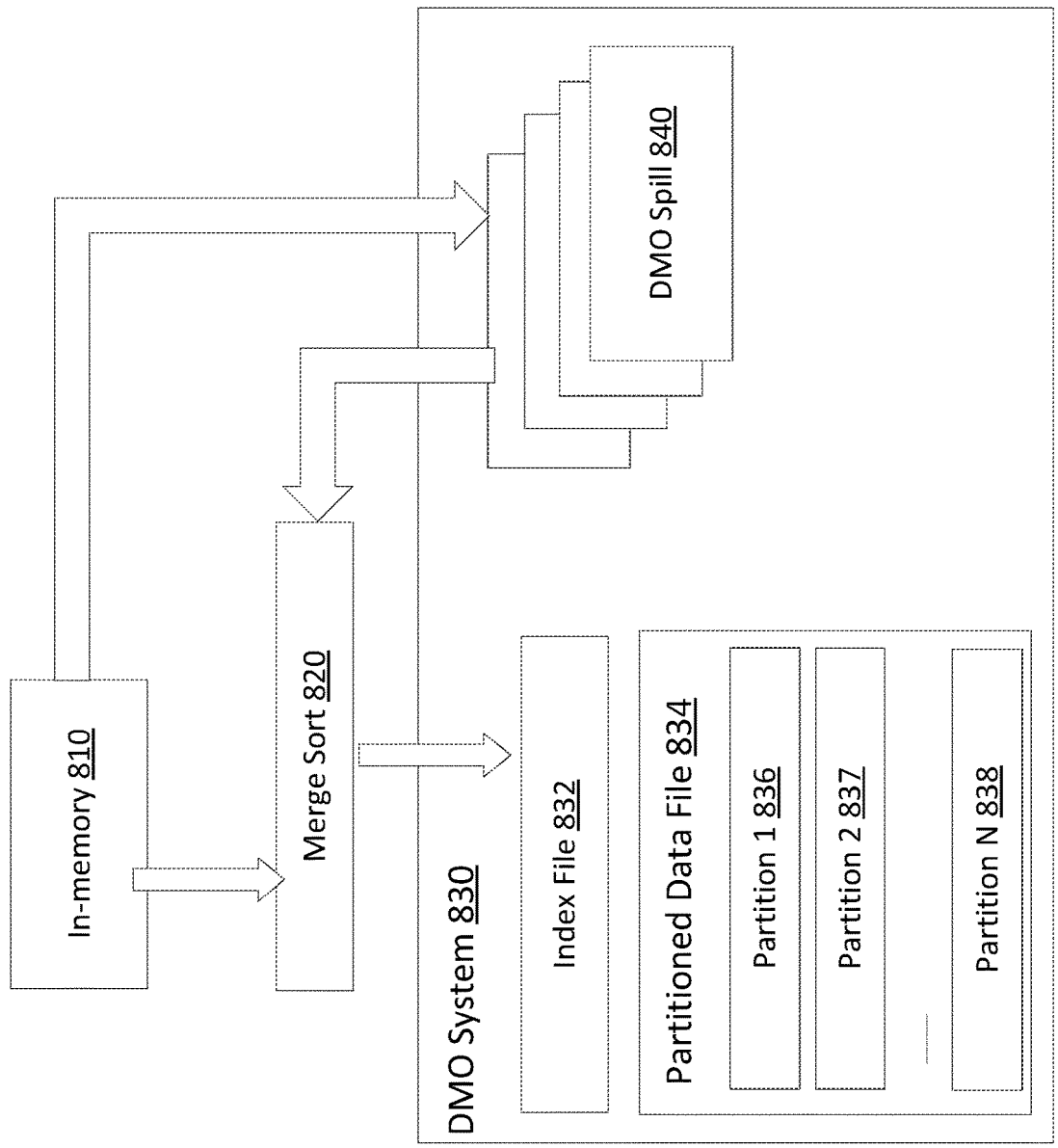
FIG. 8 is an illustration of a distributed memory object sorter.

FIG. 8 is an illustration of a distributed memory object sorter as referenced in FIGS. 6-7 above. A DMO sorter may be used by a reader and a writer to store data. In operation, data is stored in in-memory data structure when memory consumption doesn't reach a limit. If data cannot be held in in-memory, the DMO sorter will spill the in-memory data to DMO system. The spill process will serialize the in-memory data structure because a memory object is not saved directly into storage.

Then, the spilled file along with in-memory will be merged into a map output in the DMO. For example, in memory data (a', 1), (b', 2) and spill data (a', 5), ('c', 4). In the present embodiment, spilled data may be deserialized first, so that it can be compared/calculated/aggregated with the data in memory. Then, the algorithm will receive the result ('a', 6), ('b', 2), ('c', 4) and serialize them record-by-record to a data file.

In the illustrated embodiment described with reference to FIG. 8, each map output contains 2 files, namely, an index file 832 to label the start and end of each partition in the partitioned data file 834, and the data file 834 which holds the serialized/compressed/encrypted data. A temp file may be used during data output. Additionally, a commit operation is implemented with a rename of the temp file to make the operation atomic.

The DMO unsafe sorter uses a similar algorithm to the DMO sorter. However, the DMO unsafe sorter merges the spill file into the final shuffle output directly without having to deserialize-serialize the output. With reference to FIG. 6, the DMO append only map 646 is the data structure used by DMO sorter 642 when aggregation is required.

Figure 9:
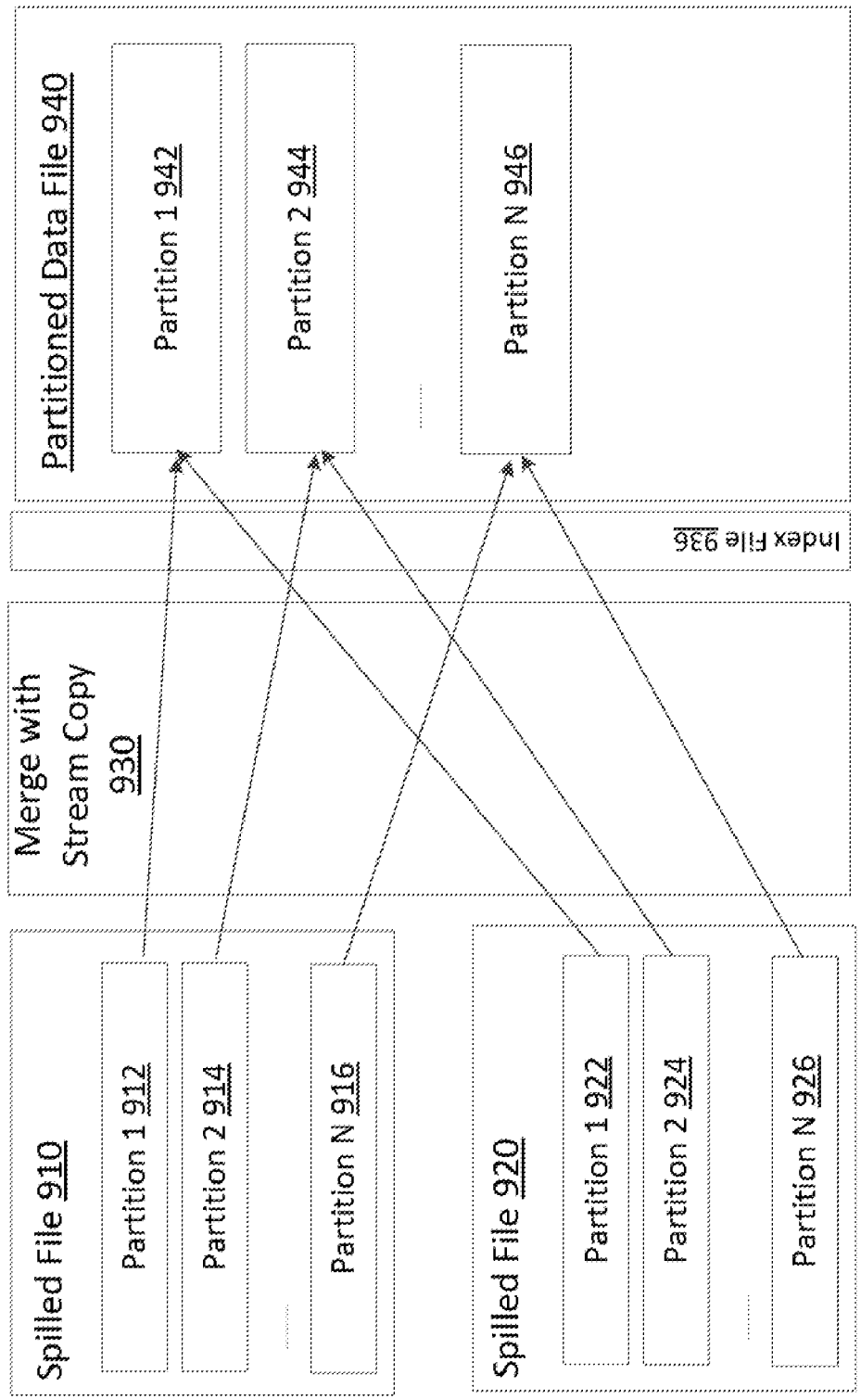
FIG. 9 is an illustration of a merge spilled file with a stream copy.
Figure 10:
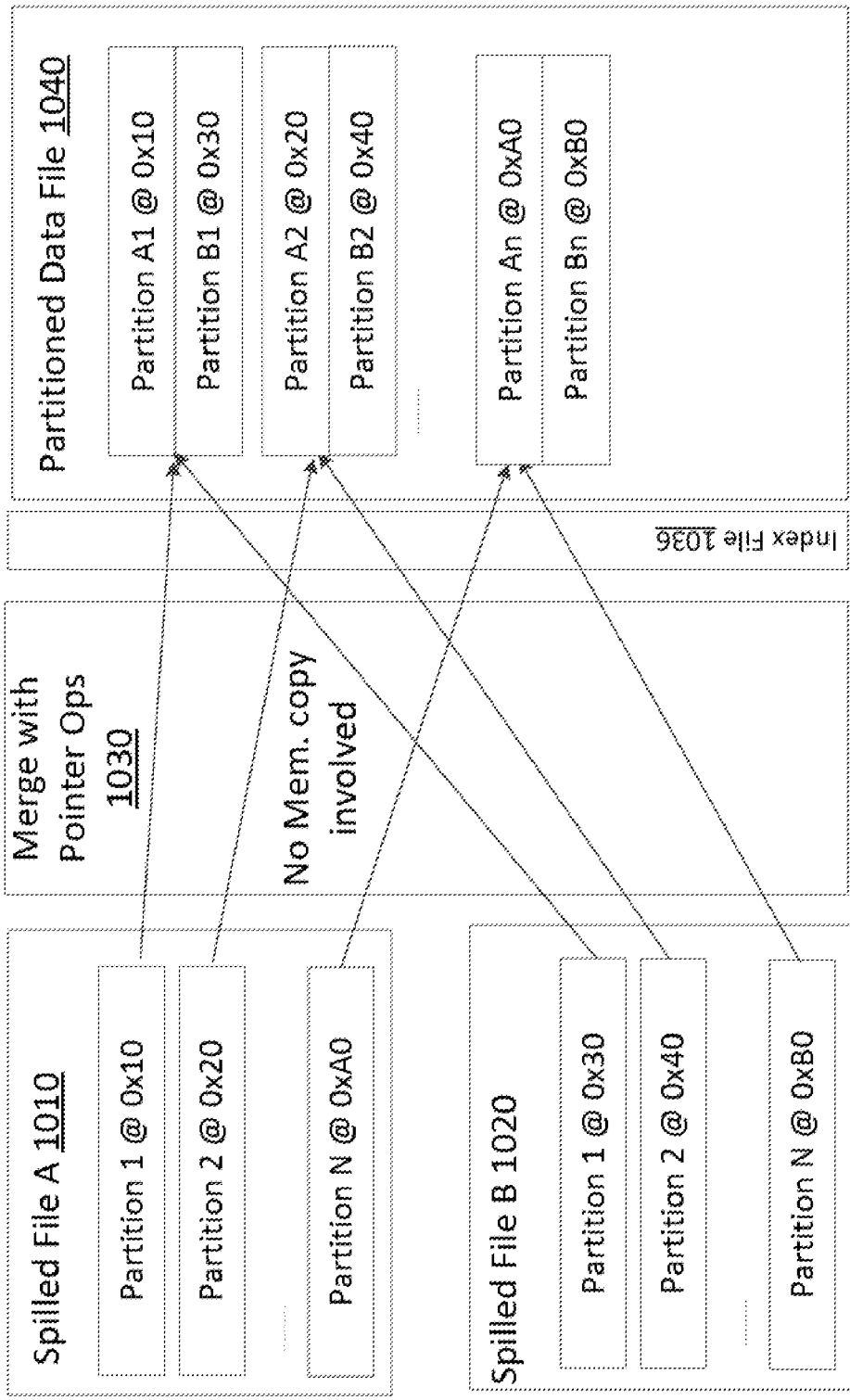
FIG. 10 is an illustration of a merge spilled file within a distributed memory object system.

In the illustrated embodiment, the unsafe shuffle algorithm is an optimization for shuffle write which only applies when it (1) contains no aggregation or output ordering, and (2) the serializer supports relocation of serialized values. The unsafe shuffle algorithm therefore is configured to relocate the serialized data in spilled file directly instead of re-do a deserialize/serialize during the generation of map output, wherein "Relocation" of the serialized data is implemented with stream copy. In some embodiments, this may be achieved by merging the partition in DMO and avoid a data copy. FIGS. 9-10 describe merging spilled files in more detail.

FIG. 9 is an illustration of a merge spilled file with a stream copy. In FIG. 9, partitions 1-N in spilled file 910 and partitions 1-N in spilled file 920 are merged with a stream copy 930 to create partitioned data file 940 having partitions 1-N. FIG. 10 is an illustration of a merge spilled file within a distributed memory object system, wherein partitions 1-N in spilled file 1010 are merged with pointer operations with spilled file B 1020 to create partitioned data file 1040.

In some embodiments, the DMO aggregator 638 may implement a spark aggregator interface and works as a data aggregator. For example, data may be aggregated with the operator supplied by the application developer. Data is then held in DMO append only map 646 which spills data to DMO SYSTEM 640 when there is not enough memory. Additionally, DMO aggregator 638 may check the size of the value during aggregation to avoid an out of memory condition when a value is too large.

In some embodiment DMO systems, temp files may be used to achieve atomic operation. In this way, any spilled file or shuffle output file may be created as a temp file in a temp folder of DMO system 640 first. In some embodiments, this file may not be visible to other nodes. In the present embodiment, there are 2 API's that may be supplied by DMO temp file, including a commit API to rename the temp file to target and make it visible to all nodes, and a revert API to remove a temp file.

Figure 11:
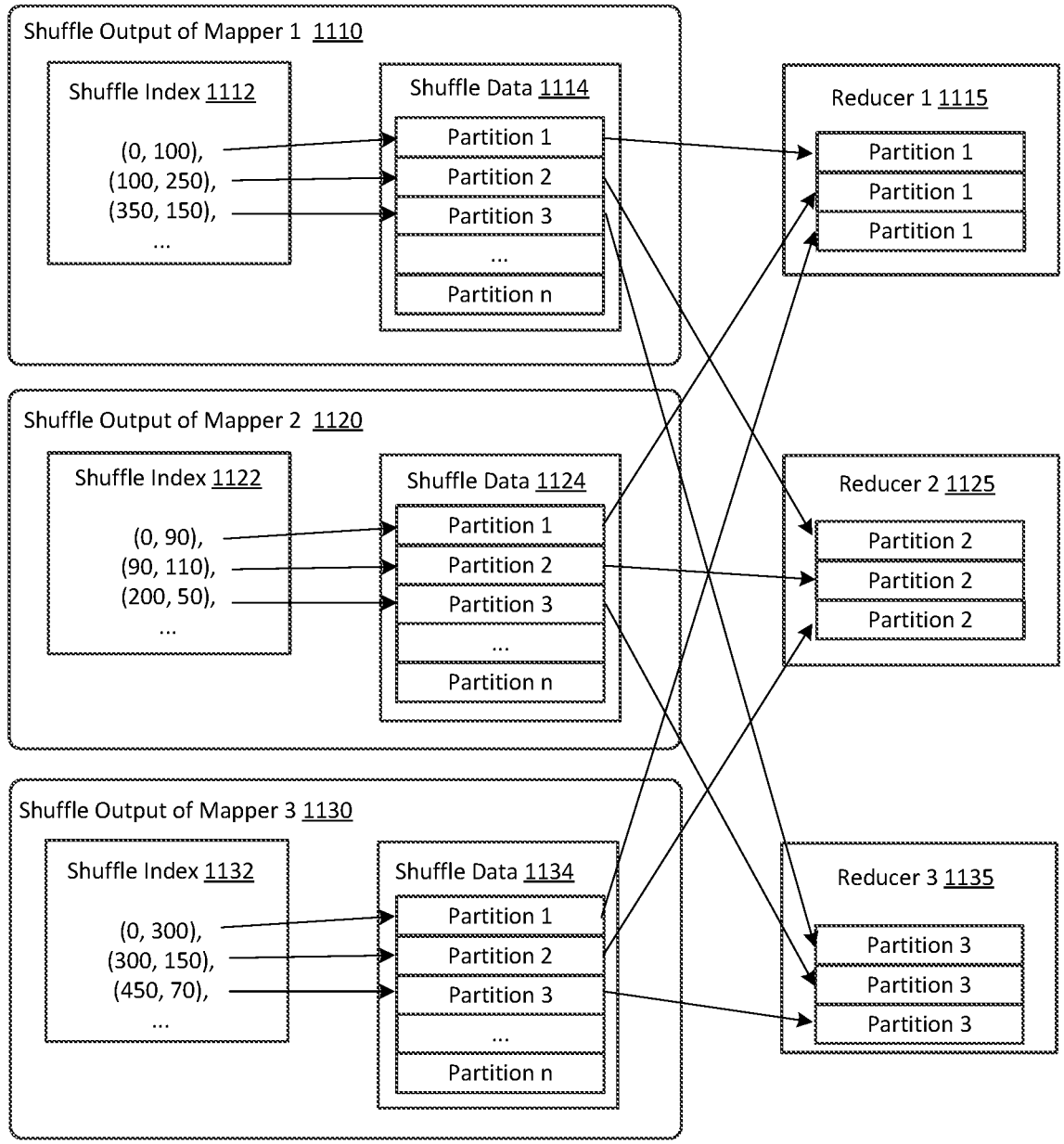
FIG. 11 is an illustration of a second embodiment of a shuffle algorithm.
Figure 12:
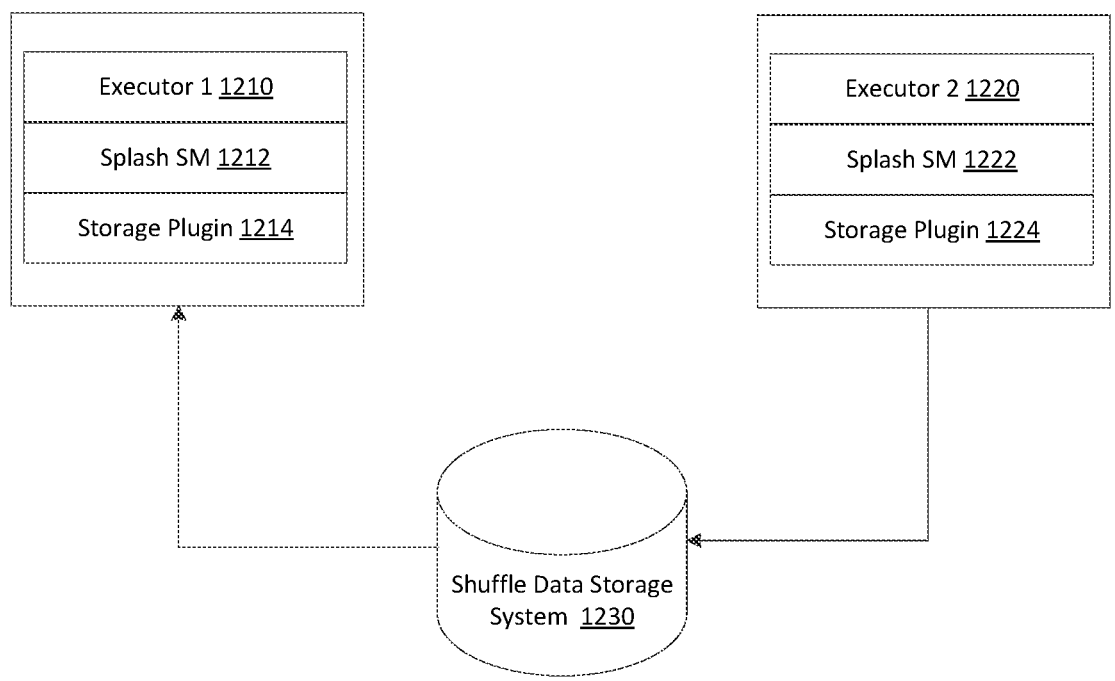
FIG. 12 is an illustration of a splash shuffle manager showing additional abstraction layers.

FIGS. 11-15 illustrate aspects of a second embodiment of a shuffle algorithm. This embodiment is described with reference to a Splash implementation, but other embodiments are not so limited and may implement the structure of this second embodiment in other suitable architectures. With reference to FIG. 11, the shuffle algorithm for Splash is an alternate embodiment to that described above with reference to a shuffle manager. In some embodiments, a shuffle procedure has two stages: a map stage and a reduce stage. In the map stage, each mapper (blocks 1110, 1120 and 1130) generates a map output which includes two types of files: index files 1112, 1122, and 1132 and data files 1114, 1124 and 1134. An index file contains a list of metadata that describes the start and the length of a partition stored in the data file. At the reduce stage, a reducer 1115, 1125 and 1135 collects the partitions belonging to it from the map outputs generated in the map stage. These partitions form the input of the reducer for its incoming reduce operation.

There are three handlers in the embodiment shuffle managers described with reference to FIGS. 5-10. These include a bypass merge sort shuffle handler for application when a partition count is lower than 200 (by default), as one example boundary. An unsafe shuffle handler for application when there is no map side combine and the serialized data could safely be relocated. And finally, a base shuffle handler as the default shuffle implementation.

In the second embodiment as described with reference to FIGS. 11-15, a Splash implementation of a shuffle manager may introduce some modifications to these handlers. As non-limiting examples, local file access is replaced by a ShuffleFile interface, which provides a more general abstraction to support both local and remote file access. The logic of committing writes is moved to TmpShuffleFile handler. The actual network and storage operations are wrapped in the OutputStream and InputStream and are constructed by TmpShuffleFile and ShuffleFile handlers. Further, the read/write operations in shuffle only communicate with InputStream and OutputStream which is decoupled from a specific network/storage. Shuffle read and write can be implemented using different network transports and back-end storage protocols by providing different implementations of the I/O steams. Additionally, listeners may be inserted into different stages of a shuffle to apply hooks. In further illustration, we turn to FIG. 12 which shows a splash shuffle manager having additional abstraction layers.

In a conventional Spark implementation, each executor directly interacts with its local disks and network. In the Splash shuffle manager embodiment illustrated in FIG. 12 however, two layers of abstraction are implemented between executors and the actual storage and network. The first layer 1212 and 1222 contain the logic for the shuffle. The second layer 1214 and 1224 contain the logic for storage and network. In this way, the shuffle manager can become stateless which in turn makes executors stateless. Further, a stateless compute node provides flexibility to add and remove nodes without re-computing a whole shuffle. Also, a commit operation of a shuffle file is atomic and un-committed files can be cleaned up easily. Furthermore, the separation of storage and computation in shuffle gives the user more choices on the storage media. That is, a user can implement different storage plugins through a splash storage interface base on their requirement. For instance, user can have a separate dedicated storage cluster for storing the shuffle data.

Additionally, through the implementation of the storage plugin, the user can have a separate storage cluster for shuffle data, which can provide large capacity and high reliability. And finally, compared to external shuffle service, a Splash shuffle manager lives in the executor which reduces the complexity of system and deployment.

Figure 13:
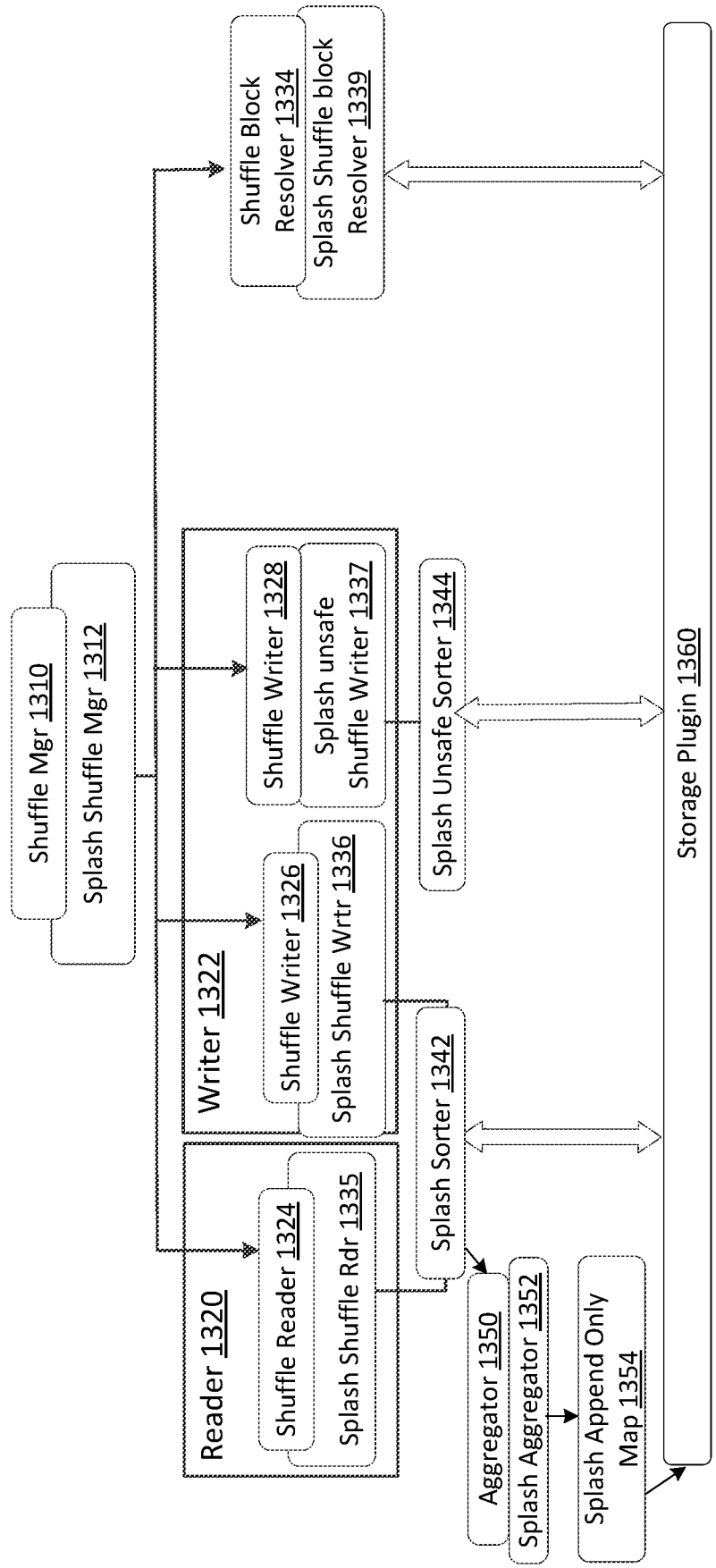
FIG. 13 is an illustration of a second embodiment of a shuffle manager.

FIG. 13 is an illustration of the architecture of a second embodiment of a shuffle manager. With reference to the figure, as one example, blocks 1310, 1324, 1326, 1328, 1334 and 1350 represent interfaces defined by Spark, blocks 1312, 1320, 1322, 1335, 1336, 1337, 1339 and 1352 represent Splash implementation classes, and blocks 1342, 1344 and 1354 represent data structures.

We not turn to each block to explain functionality in more detail. ShuffleManager 1310 is the entry point for a shuffle stage. ShuffleWriter blocks 1326 and 1328 are responsible for writing shuffle data in map stage, and further can utilize SplashSorter 1342 or SplashUnsafeSorter 1344 to hold data in memory. If there is not enough memory to hold all the data, the data is spilled to a temporary shuffle file. After the data is processed, SplashSorter 1342 and SplashUnsafeSorter 1344 merge the data in both memory and spilled files, and they create shuffle outputs and persist them into the shuffle data storage system. Next, the ShuffleReader is used in the reducer stage to collect data from the shuffle data storage system. While in this example embodiment, the SplashAggregator 1352 is responsible for performing data aggregation and can use SplashAppendOnlyMap to hold the data in memory and spill to TmpShuffleData if there is not enough memory. SplashShuffleBlockResolver 1339 is used to locate shuffle data in the shuffle data storage system needed by reducer. In the present embodiment, the algorithm to find shuffle data is stateless, but not all embodiments are necessarily limited in this manner. We now turn to FIG. 14 to illustrate storage plugins within the second embodiment shuffle manager 1410.

With reference to the figure, a user can supply his/her own storage and network implementation for a Splash shuffle manager by implementing additional storage-plugins. Two example plugins include a shared file system 1460 and 1464 plugin to run on a mountable shared file system like NFS, and a local file system 1462 and 1466 plugin to implement the same behavior as the first embodiment shuffle manager described hereinabove with reference to FIGS. 5-10.

Figure 14:
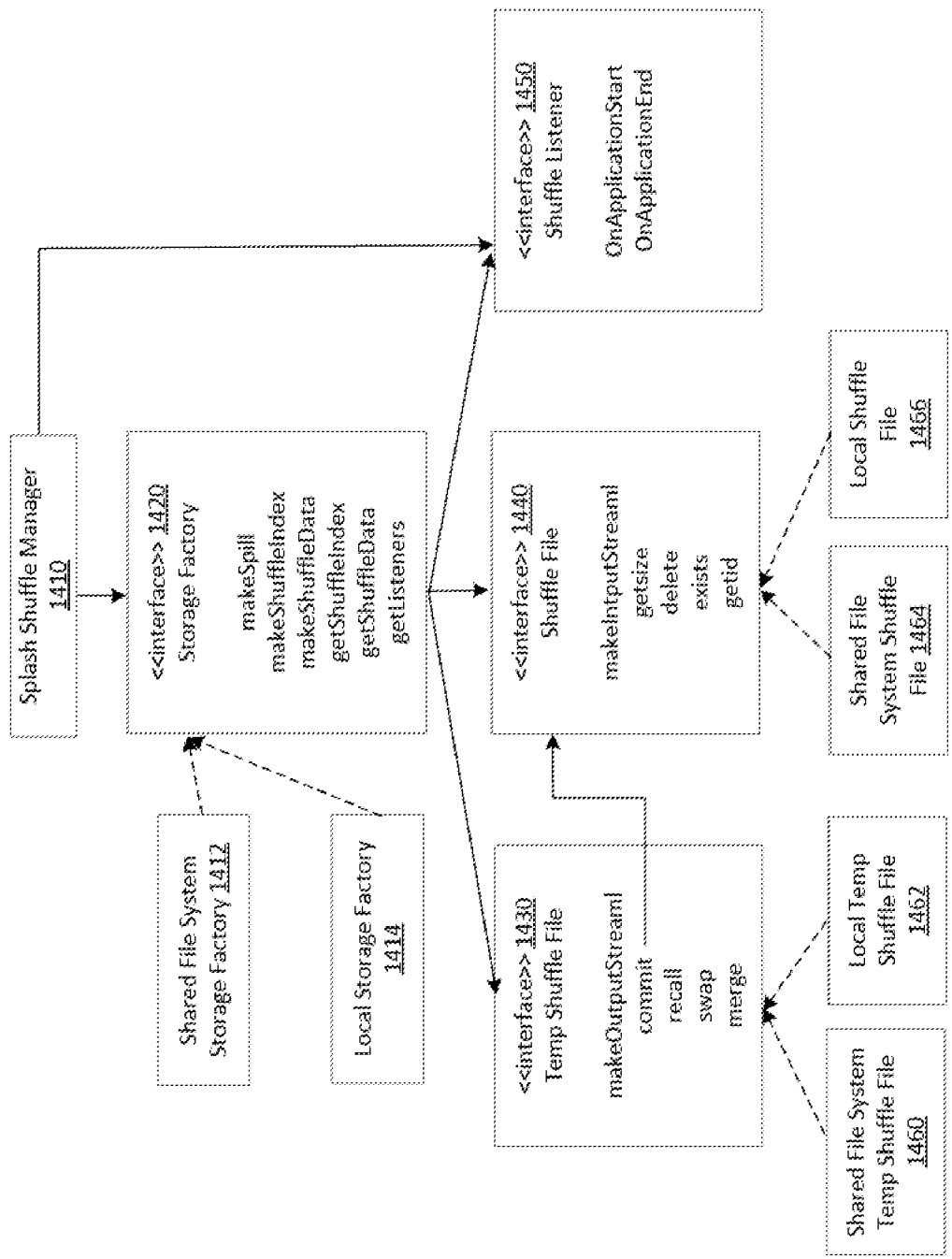
FIG. 14 is an illustration of a second embodiment of a shuffle manager with storage plugins.
Figure 15:
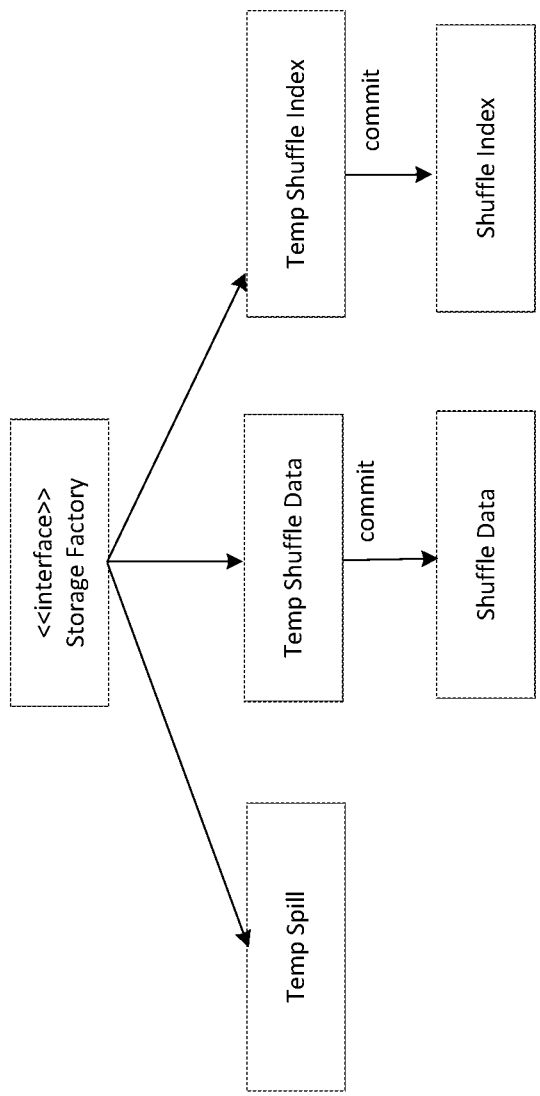
FIG. 15 is an illustration of a storage factory in the second embodiment of a shuffle manager.

In detail and with reference to the embodiment in FIGS. 14 and 15, the Storage Factory interface 1420 defines the entry point for the storage/IO functions. The methods of this interface could be divided into several categories including meta data operations and temporary file generators. Metadata operations return the storage metadata such as a getShuffleFolder to retrieve the location of the shuffle files of the specified Spark application. Meta data operations may also return the number of temp files and shuffle files within the system. Additionally, getShuffleFileCount could be used to return the total number of shuffle files managed by the plugin, while getTmpFileCount could be used to return the total number of temp files managed by the plugin.

On the other hand, temp file generators may be used to create the temp files for inputs and outputs. These temp files are divided into three types based on their use cases, as follows: a makeSpillFile to retrieve a writable TmpShuffleFile instance for spill temp file. Such files are used for holding spilled data. They could be persisted using fast local storage such as DRAM and SSD to speed up writing and reading spilled data; a makeDataFile to retrieve a writable TmpShuffleFile instance. This temp file will be committed to become a shuffle data file when write completes; and a makeIndexFile to retrieve a writable TmpShuffleFile instance. This temp file will be committed to become a shuffle index file when write completes.

Furthermore, in the storage factory interface 1420, the getDataFile and getIndexFile are used to retrieve the ShuffleFile instance, while the getDataFile retrieves a read only ShuffleFile instance for shuffle data file. Additionally, in the present embodiment the getIndexFile can retrieve a read only ShuffleFile instance for shuffle index file, while getListeners retrieve a collection of shuffle manager listeners and setConf passes a SparkConf instance to a StorageFactory instance so that storage plugins have access to Spark configurations. Finally, cleanup methods can be used to reset shuffle output and temp folders. That is, cleanShuffle cleans up the shuffle files of the specified application while reset can be used to clean up all files managed by a storage plugin.

The ShuffleFile interface 1440 is the interface for shuffle related files and in usage it is similar to a Java File class while the files referenced by ShuffleFile are read only. The Shufflefile interface 1440 may utilize getSize to retrieve the size of a file, and exists to check the existence of a file. Further, delete can be used to remove a file, while getPath returns the path of the file instance. Additionally, in shufflefile interface 1440, makeInputStream can be used to construct an InputStream of this ShuffleFile.

In the present embodiment, the TmpShuffleFile 1430 interface is used to extend ShuffleFile 1440. Example additions include using commit and recall as atomic methods to allow a user to commit shuffle output or rollback uncommitted shuffle output. Swap can be used to swap data between two TmpShuffleFile instance. Further, merge can be used to combine multiple files into one. The default implementation of this method is to copy and concatenate a list of files into one large file. Additionally, makeOutputStream can be used to construct an OutputStream of this TmpShuffleFile 1430. In the present embodiment, uuid returns a unique UUID instance of this TmpShuffleFile, while create creates an empty file in shuffle data storage system. The detail functionality may also include a getCommitTarget to retrieve the target ShuffleFile, wherein an error is returned if the function is invoked by a TmpShuffleFile instance representing a spill file. This is because the spill file cannot be committed to become a shuffle data file or a shuffle index file. And finally, a ShuffleListener interface can be used to invoke during the shuffle procedure.

Implementation Alternatives

To implement larger memory space than physically available on a node, some form of demand paging is necessary. Three implementation approaches are presented: user space, kernel, and hypervisor.

Figure 3:
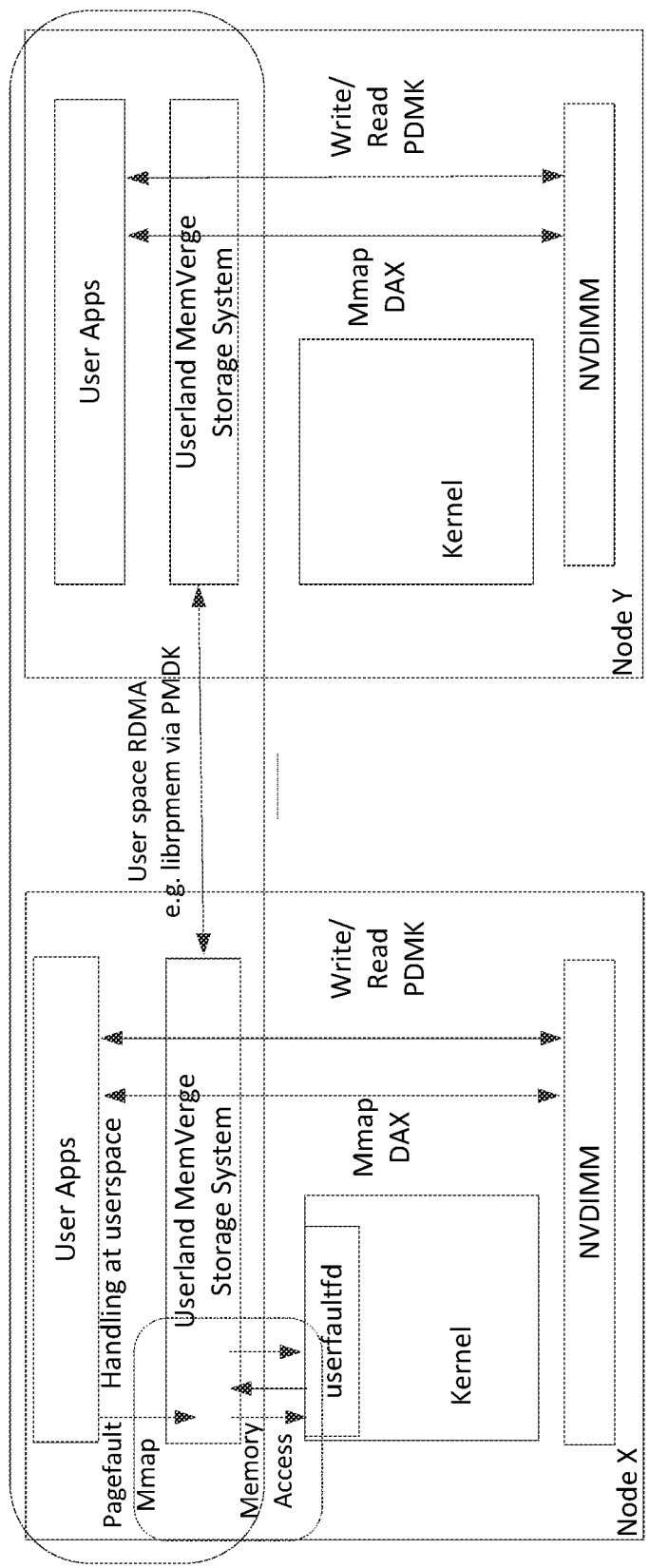
FIG. 3 is an illustration of components and processes of implementing a larger memory space across nodes by a user space approach.

FIG. 3 is an illustration of components and processes of implementing a larger memory space across nodes by a user space approach. The user space approach uses the Linux userfaultfd mechanism to monitor the logical address space of the client and provide notification whenever access to a non-resident page of the object is attempted. Since a user space process cannot directly control physical memory mapping, it uses a direct access (DAX) file system to indirectly affect this. The data for the faulting area is copied to a local file and that file is mapped into the client's address space, thus materializing the data for the page fault. This mechanism is the least intrusive to the operating environment in that it does not require a new operating system. A user space approach may provide fast development, which in turn may be beneficial to both prototype and product developments. Furthermore, a user space approach may facilitate experiments with different new technologies invented for user space apps. Additionally, a user space approach may be easy to deploy, easy to containerize, and may easily connect to other user space storage frameworks such as SPDK. However, it may utilize indirect access to memory map.

In some embodiments, a kernel space approach uses the kernel memory management to intercept page faults from the client process. As a kernel entity, the page fault handler can directly manipulate the address map. The handler can maintain a memory pool where it caches a copy of the required data, and then directly map it into the client's address space. A kernel space approach can provide a fast, efficient access to memory map; however, it also could use a custom OS and may increase scope of testing (re-verify OS).

Figure 4:
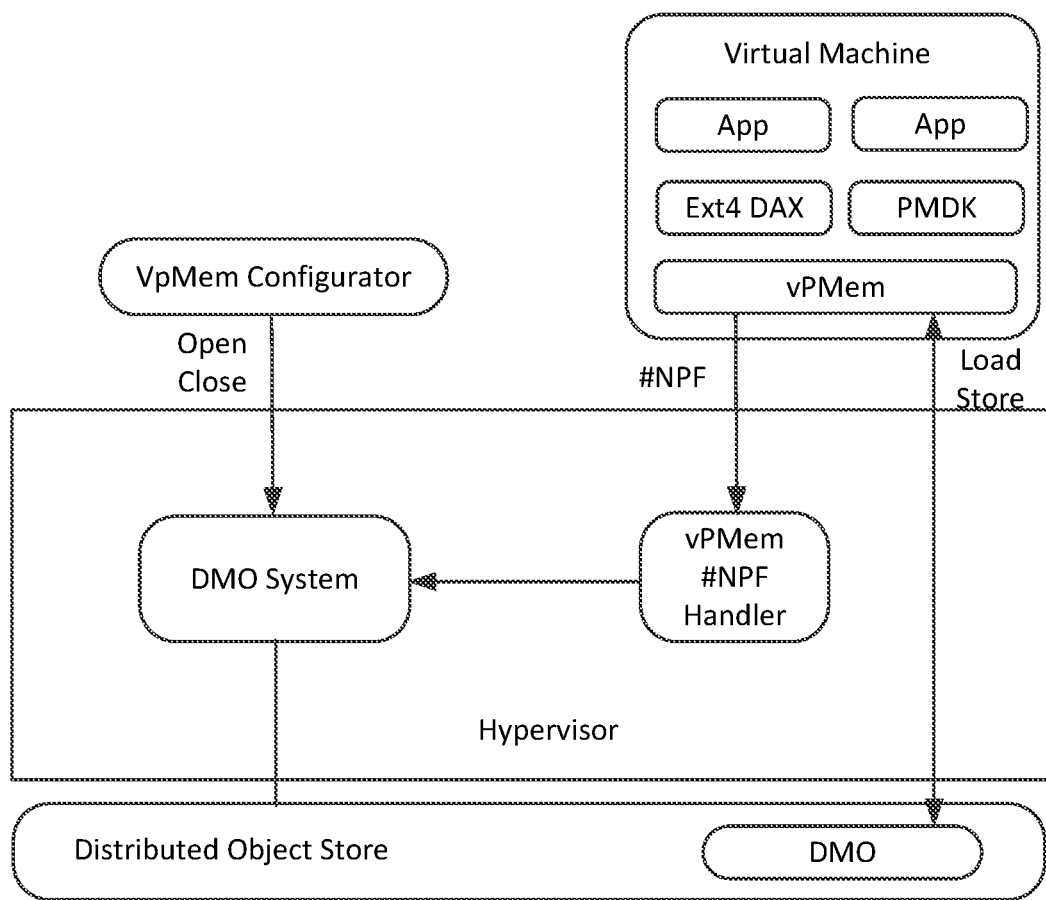
FIG. 4 is an illustration of components and processes of implementing a larger memory space across nodes by a hypervisor approach.

FIG. 4 is an illustration of components and processes of implementing a larger memory space across nodes by a hypervisor approach. In the hypervisor approach, one or more virtual PMEM (vPMem) devices is presented to the host operating system. Each vPMem is a logical address space within the hypervisor address map that gets presented to the host operating system as its physical address space. The hypervisor's memory manager intercepts the page faults to that space to materialize the assigned object's data. Analogous to the OS kernel, a hypervisor has direct access to its map. The page fault handler can therefore maintain a memory pool in which it caches required data, and then map that data into the host OS's address space to service a page fault. Note that the page fault can be from a user application in the host OS, or from a host OS component, etc. This approach can provide a fast, efficient access to memory map, and does not require a custom operating system.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A shuffle manager method for a distributed memory object, the method comprising:
    forming a system cluster comprising a plurality of nodes, wherein each node includes a memory, a processor and a network interface to send and receive messages and data, wherein the network interface operates on remote direct memory access;
    creating a plurality of sharable memory spaces having partitioned data, wherein each space is a distributed memory object having a compute node, wherein the sharable memory spaces are at least one of persistent memory or DRAM cache; and
    storing data in an in-memory data structure when there is available memory in a compute node;
    if there is an out of memory condition, serializing at least some of the in-memory data and spilling it to a distributed memory object system to persist shuffled data outside the compute node; and
    deserializing spilled data that was serialized and spilled to a distributed memory object, and merging the deserialized spilled data with data in in-memory to create a map output.

2. The method of claim 1, the map output includes an index file to label the start and end of each partition in the data file.

3. The method of claim 1, wherein the map output includes a data file which contains serialized data.

4. The method of claim 1, wherein when the data does not contain aggregation or output ordering, and when a serializer supports relocation of serialized values, relocating the serialized data in spilled file directly without deserializing or serializing data while creating the map output.

5. The method of claim 4, further comprising relocating serialized data using a stream copy.

6. The method of claim 4, further comprising relocating serialized data by merging the partition in the distributed memory object.

7. A shuffle manager for a distributed memory object, comprising:
    a system cluster comprising a plurality of nodes, wherein each node includes a memory, a processor and a network interface to send and receive messages and data, wherein the network interface operates on remote direct memory access;
    a plurality of sharable memory spaces having partitioned data, wherein each space is a distributed memory object having a compute node, wherein the sharable memory spaces are at least one of persistent memory or DRAM cache; and
    an in-memory data structure to store data when there is available memory in a compute node; and
    a distributed memory object sorter to serialize at least some of the in-memory data and spill it to a distributed memory object system to persist shuffled data outside the compute node, wherein the spilled data that was serialized and spilled to the distributed memory object is deserialized, and merging the deserialized spilled data with data in the in-memory to create a map output.

8. The shuffle manager of claim 7, wherein the map output includes an index file to label the start and end of each partition in the data file.

9. The shuffle manager of claim 7, wherein the map output includes a data file which contains serialized data.

10. The shuffle manager of claim 7, wherein when the data does not contain aggregation or output ordering, and when a serializer supports relocation of serialized values, the shuffle manager further being configured to relocate the serialized data in spilled file directly without deserializing or serializing data while creating the map output.

11. The shuffle manager of claim 7, further being configured to relocate serialized data using a stream copy.

12. The shuffle manager of claim 7, further being configured to merge the partition in the distributed memory object to relocate the serialized data.

* * * * *